US009353815B1

(12) United States Patent
Eden

(10) Patent No.: US 9,353,815 B1
(45) Date of Patent: May 31, 2016

(54) SYSTEMS AND METHODS FOR DETECTING WEAR OF BRAKE PADS

(71) Applicant: Gideon Eden, Ann Arbor, MI (US)

(72) Inventor: Gideon Eden, Ann Arbor, MI (US)

(*) Notice: Subject to any disclaimer, the term of this patent is extended or adjusted under 35 U.S.C. 154(b) by 0 days.

(21) Appl. No.: 14/829,283

(22) Filed: Aug. 18, 2015

Related U.S. Application Data

(60) Provisional application No. 62/178,660, filed on Apr. 17, 2015, provisional application No. 62/230,732, filed on Jun. 15, 2015, provisional application No. 62/231,607, filed on Jul. 11, 2015.

(51) Int. Cl.
*F16D 66/02* (2006.01)

(52) U.S. Cl.
CPC .................................. *F16D 66/024* (2013.01)

(58) Field of Classification Search
CPC ..... F16D 66/024; F16D 66/02; F16D 66/022; F16D 66/025; F16D 66/026; F16D 66/027
USPC .............. 188/1.11 L, 1.11 E, 1.11 W, 1.11 R; 340/454, 453; 702/34, 38
See application file for complete search history.

(56) References Cited

U.S. PATENT DOCUMENTS

| | | | | |
|---|---|---|---|---|
| 5,454,450 A * | 10/1995 | Tanigawa | ............... | F16D 66/024 188/1.11 L |
| 6,459,726 B1 | 10/2002 | Ovard | | |
| 7,877,216 B2 * | 1/2011 | Wright | .................... | F16D 66/02 188/1.11 E |
| 8,310,356 B2 * | 11/2012 | Evans | ................... | B60T 17/221 188/1.11 R |
| 2002/0077088 A1 * | 6/2002 | Yamanaka | ......... | G05B 19/4183 455/414.1 |
| 2002/0116992 A1 * | 8/2002 | Rickel | ..................... | B60C 11/24 73/146 |
| 2006/0042734 A1 * | 3/2006 | Turner | .................... | B60C 11/24 152/154.2 |
| 2008/0190712 A1 * | 8/2008 | Hagberg | ............... | F16D 65/092 188/1.11 L |
| 2009/0050418 A1 * | 2/2009 | Vargas | .................. | F16D 66/025 188/1.11 L |
| 2013/0099897 A1 | 4/2013 | Forster | | |
| 2013/0192933 A1 * | 8/2013 | King | ..................... | F16D 66/027 188/1.11 L |
| 2015/0152931 A1 * | 6/2015 | Moore | .................. | F16D 66/022 188/1.11 L |

OTHER PUBLICATIONS

Gill—Downloaded on Nov. 11, 2015 from http://gillsc.com/content/through-hole-position-sensor.html; prior art reference as of at least Nov. 11, 2015.
Wikipedia—Downloaded on Nov. 11, 2015 from https://en.wikipedia.org/wiki/Brake_wear_indicator; prior art reference as of at least Nov. 11, 2015.

* cited by examiner

*Primary Examiner* — Pamela Rodriguez

(57) ABSTRACT

A system can be used to indicate wear of a brake pad. The system can include a brake housing, a brake pad mechanically coupled to the brake housing, and a sensor mechanically coupled to the brake pad. The sensor can determine when the brake pad has been worn to a predetermined location by a rotating portion of a wheel. The system can also include an electronic module electrically coupled to the sensor and mechanically coupled to the brake housing. The electronic module can include a radio frequency antenna configured to wirelessly receive radio frequency energy from an external radio frequency transmitter, and an energy converter electrically coupled to the radio frequency antenna. As well, the electronic module can include an internal transmitter electrically coupled to the energy converter and the radio frequency antenna.

20 Claims, 8 Drawing Sheets

SYSTEMS AND METHODS FOR DETECTING WEAR OF BRAKE PADS

CROSS-REFERENCE TO RELATED APPLICATIONS

This application claims the benefit of U.S. Provisional Patent Application No. 62/178,660; filed Apr. 17, 2015; and entitled BRAKE WEAR INDICATOR SYSTEM. The entire contents of U.S. Provisional Patent Application No. 62/178,660 are incorporated herein by reference.

This application claims the benefit of U.S. Provisional Patent Application No. 62/230,732; filed Jun. 15, 2015; and entitled BRAKE WEAR INDICATOR DEVICE. The entire contents of U.S. Provisional Patent Application No. 62/230,732 are incorporated herein by reference.

This application claims the benefit of U.S. Provisional Patent Application No. 62/231,607; filed Jul. 11, 2015; and entitled SYSTEM AND METHOD TO DETECT THE WEARING STATUS OF A VEHICLE'S BRAKE PAD. The entire contents of U.S. Provisional Patent Application No. 62/231,607 are incorporated herein by reference.

BACKGROUND

1. Field

The invention is directed in general to vehicle brake pads, and more specifically, to brake pad wear sensors to measure the actual amount of wear of a brake pad.

2. Description of Related Art

Vehicle maintenance requires periodic inspection of brake pads in order to assess the deterioration of the brake pads and ultimately determine when the brake pads need to be replaced. Failure to periodically perform this inspection can result in accidents due to brake malfunctions, which can result in danger to vehicle occupants and costly repairs to the vehicle.

Accordingly, brake inspections are required for various types of braking systems, such as drum-based brakes, in which a padded "shoe" presses against the wall of the wheel's drum, and disk brakes, in which two pads press against opposing sides of the rotating wheel disk (rotor). In the disk brake system, the rotor is a hard metal rotating disk, which is attached to the rotating wheel. Two brake pads made of relatively soft material are located on both sides of the rotor at close proximity. When the brake pedal is depressed, the two pads are forced towards the rotor to provide friction force that slows the wheel's rotation. As time progresses, the brake pads can become thinner and may need to be replaced. In most vehicles, it is not obvious to the vehicle operator as to when the brake pads need to be replaced because each wheel often has to be removed to inspect the brake pads. Consequently, the brake pad can totally wear out and the hard metal pad carriers (also called pad holders) can come in contact with the rotor causing substantial damage and creating dangerous and inefficient braking of the vehicle.

In order to improve the inspection process, some vehicles can include embedded sensors to indicate excessive pad wear. As shown in FIG. 1, some systems can include a contact sensor attached in parallel to the internal wall of the pad holder or embedded in the pad at a specific distance from the pad holder. When the pad is worn to a point where it needs to be replaced, the sensor can establish electrical contact with the rotor. An electrical wire can convey the information to the vehicle's dashboard to generate a visual alarm indication for the vehicle operator. As further shown in FIG. 1, some vehicles may employ a distance sensor, which can continuously measure the distance between the two pad holders and thereby provide the information via electrical wires to the vehicle's dashboard.

There are several disadvantages of these systems, namely, undue false positives indicating to the vehicle operator to replace the brake pads. Car manufacturers may incur substantial liability for any false negative occurrences. In other words, if the brake pad is in need of replacement and the system does not generate an alarm, and a consequent accident occurs, the manufacturer may be responsible due to the fact that no alarm was generated. Consequently, the sensors and associated alarm indications may be designed to be overly sensitive to avoid the false negative scenario. Even still, a rupture in the wires connecting the sensor to the dashboard can also produce an alarm not related to the actual condition of the brake pad. This false positive indication can become so frequent and so disturbing to vehicle operators, that many operators may neutralize or deactivate the system entirely, thereby defeating the whole purpose of the system.

Another disadvantage to the "dashboard approach" is that it does not typically provide specific information about which brake pad needs to be replaced. Because brake pads may wear at different rates, the operator will still have to remove all the wheels to determine which pad is in need of maintenance. For vehicles, such as large trucks with many wheels, in which removal of wheels is costly and labor intensive, the dashboard approach can provide little value. Thus, there is a need for devices and methods to allow reliable inspection of brake pads without removing the wheels.

SUMMARY

The present disclosure includes systems for indicating wear of a brake pad. Systems can include a brake housing; a brake pad mechanically coupled to the brake housing; and a sensor mechanically coupled to the brake pad. The sensor can determine when the brake pad has been worn to a predetermined location by a rotating portion of a wheel. The system can also include an electronic module electrically coupled to the sensor and mechanically coupled to the brake housing or located in close proximity to the brake housing. The electronic module can include a radio frequency antenna configured to wirelessly receive radio frequency energy from an external radio frequency transmitter; and an energy converter electrically coupled to the radio frequency antenna. The energy converter can be configured to transform radio frequency energy to supply energy. The electronic module can also include an internal transmitter electrically coupled to the energy converter and the radio frequency antenna. The internal transmitter can be powered by the supply energy and configured to wirelessly transmit electrical information to the external radio frequency transmitter via the radio frequency antenna.

Systems can also include the external radio frequency transmitter communicatively coupled to the radio frequency antenna. The electronic module can be located within 12 inches of the brake pad.

The rotating portion can comprise one of a rotating disk and a drum. As well, the sensor can be at least partially embedded within the brake pad.

The sensor can include an electrically conductive filament embedded in the brake pad at a predetermined distance with respect to a brake pad surface that contacts the rotating portion of the wheel. The electrical conductivity as measured by the conductive filament can decrease when the brake pad is worn to at least the predetermined location.

The electronic module can include memory mechanically coupled to the brake housing and electrically coupled to the energy converter and the internal transmitter. The memory can store at least one of initial brake pad thickness information, brake pad installation information, and wheel identification information.

Systems can also include a pad holder mechanically coupled to the brake housing. The sensor can be configured to determine distance between the pad holder and a brake pad surface that contacts the rotating portion of the wheel.

In embodiments, the sensor can be a first sensor embedded within the brake pad at a first thickness of an internal portion of the brake pad. The system can also include a second sensor embedded within the brake pad at a second thickness of the internal portion of the brake pad. The second sensor can determine when the brake pad has been worn to a second predetermined location. As well, the system can include a third sensor embedded within the brake pad at a third thickness of the internal portion of the brake pad. The third sensor can determine when the brake pad has been worn to a third predetermined location.

The disclosure can also include systems for indicating wear of a brake pad, which includes a brake pad having electrically conductive material located within an internal portion of the brake pad. The internal portion can be at least partially conductive and can have a predetermined electrical resistivity. The system can also include at least two electrodes embedded within the brake pad. The at least two electrodes can measure the electrical resistivity of the internal portion of the brake pad. The electrical resistivity can indicate a thickness of the internal portion of the brake pad after the internal portion has been eroded by a rotating portion of a wheel. The electrical resistivity can be inversely proportional to a thickness of the internal portion.

Systems can also include a pad holder mechanically coupled to the brake pad; and a resistivity meter electrically coupled to the at least two electrodes and located between the brake pad and the pad holder. The resistivity meter can determine the electrical resistivity.

Embodiments of the system can also include a resistivity meter electrically coupled to the at least two electrodes and located along a dashboard of a vehicle. Systems can also include a status indication displayed on the dashboard. The status indication can be indicative of the thickness of the internal portion of the brake pad. The status indication can comprise an alarm that alerts a user that the thickness of the internal portion meets a predetermined thickness indicating that the brake pad needs to be replaced. The conductive material can comprise at least one of metallic particulate matter, conductive carbon particulate matter, and a combination of metallic particulate matter and conductive carbon particulate matter.

Systems can include a radio frequency antenna configured to wirelessly receive radio frequency energy from an external radio frequency transmitter. The radio frequency energy can generate electrical current via the electrically conductive material located within the internal portion of the brake pad. The electrical current can indicate the electrical resistivity of the internal portion.

The disclosure also includes methods of determining thickness of a brake pad that impedes rotation of a wheel mechanically coupled to a vehicle. The thickness can be determined without removing the wheel from the vehicle. Methods can include wirelessly providing radio frequency energy from an external radio frequency transmitter to a radio frequency antenna mechanically coupled to a brake housing that holds the brake pad; converting, by an energy converter electrically coupled to the radio frequency antenna, the radio frequency energy into supply energy; activating, by the supply energy, a sensor mechanically coupled to the brake pad and electrically coupled to the energy converter and the radio frequency antenna; wirelessly receiving, by the external radio frequency transmitter, information regarding the thickness of an internal portion of the brake pad, wherein the external radio frequency transmitter is communicatively coupled to an internal transmitter electrically coupled to both the sensor and the radio frequency antenna; and displaying, by the external radio frequency transmitter, an indication of the thickness of the internal portion of the brake pad. The external radio frequency transmitter may not be mechanically coupled to the vehicle.

The sensor can include an electrically conductive filament embedded within the brake pad at a predetermined distance with respect to a brake pad surface that contacts the rotating portion of the wheel. Methods can include determining, by the sensor, whether the brake pad has been worn to the predetermined distance; and displaying, by the external radio frequency transmitter, an indication of whether the brake pad has been worn to the predetermined distance thereby indicating whether the brake pad needs to be replaced.

The internal portion of the brake pad can include electrically conductive material such that the internal portion is at least partially conductive and has a predetermined electrical resistivity. The sensor can be embedded within the internal portion and the sensor can detect an electrical resistivity of the internal portion. The electrical resistivity can be inversely proportional to a thickness of the internal portion. Methods can further include determining the electrical resistivity of the internal portion of the brake pad; and displaying, by the external radio frequency transmitter, the thickness of the internal portion to thereby indicate whether the brake pad needs to be replaced.

In embodiments, memory can be mechanically coupled to the brake housing and electrically coupled to the internal transmitter and the radio frequency antenna. The memory can store brake pad thickness information, brake pad wear profile information, brake pad installation information, and wheel identification information. Methods can include displaying, by the external radio frequency transmitter, an indication of brake pad thickness information, brake pad wear profile information, brake pad installation information, and wheel identification information.

Some embodiments can include a resistivity meter electrically coupled to the radio frequency antenna and the energy converter. Methods can include displaying, by a dashboard of the vehicle, an indication of real-time thickness of an internal portion of a first brake pad.

Methods can also include displaying, by the dashboard of the vehicle, an indication of real-time thickness of an internal portion of a second brake pad; and displaying, by the dashboard of the vehicle, an indication of real-time thickness of an internal portion of a third brake pad. Methods can also include displaying, by the dashboard of the vehicle, an indication of real-time thickness of an internal portion of a fourth brake pad; displaying, by the dashboard of the vehicle, an indication of real-time thickness of an internal portion of a fifth brake pad; and even displaying, by the dashboard of the vehicle, an indication of real-time thickness of an internal portion of a sixth brake pad.

Methods can also include storing, by the memory, an initial electrical resistivity of the internal portion of the brake pad, and determining a present electrical resistivity of the internal portion of the brake pad. In some embodiments, the indication of the thickness of the internal portion can be based upon a ratio of the initial electrical resistivity to the present electrical resistivity.

The embodiments described above include many optional features and aspects. Features and aspects of the embodiments can be combined.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments. The above and other features of the present invention will become more apparent by describing in detail exemplary embodiments thereof with reference to the accompanying drawings, in which.

DETAILED DESCRIPTION

Figure 1:
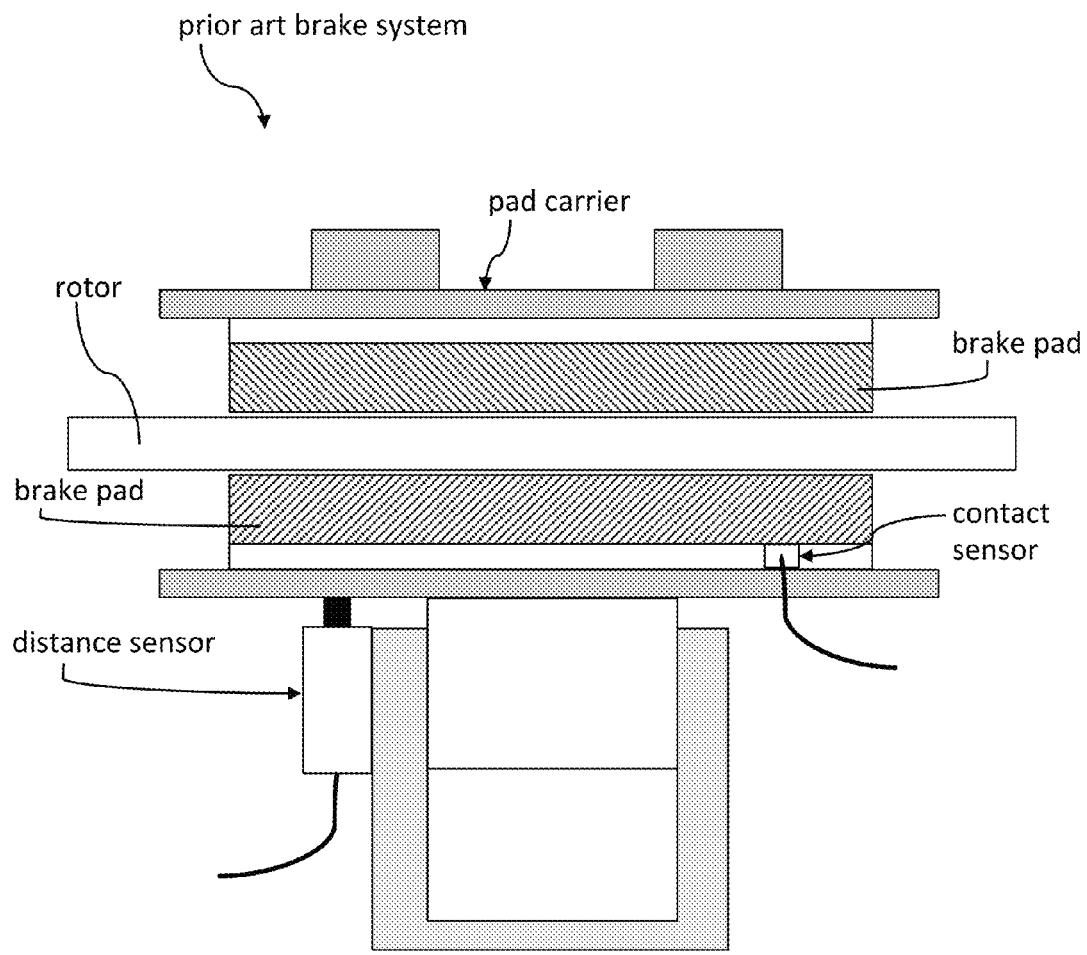
FIG. 1 illustrates a brake system, according to a prior art embodiment.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

LIST OF REFERENCE NUMERALS

10—Brake system
12—Brake pad
13—Internal portion
14—Rotor
16—Pad holder
17—Brake housing
18—Sensor
19—Brake pad surface
20—Electronic module
21—Vehicle dashboard
22—Antenna (e.g. a dashboard antenna and/or a radio frequency antenna)
24—Converter
26—Transmitter
28—Meter
30—Memory
32—Insulation
34—Inner housing
36—Predetermined location
38—Predetermined distance
40—External transmitter
41—Wireless communication
42—Status indication
44—Alarm

INTRODUCTION

The brake system 10, as disclosed, can address the disadvantages as previously described. For example, embodiments of the brake system 10 can wirelessly provide information regarding wear of a brake pad 12 of a vehicle. In this regard, a technician performing an inspection of the brake pad 12 may interrogate the brake system 10, via an external wireless transmitter, and thereby determine the wear of the brake pad 12. The technician may thereby perform the inspection without having to remove the individual wheel from the vehicle. In this regard, once the technician determines which brake pads 12 are in need of being replaced, only the wheels of worn or defective brake pads 12 may be removed to thereby replace the respective brake pads 12. These are just a few benefits and the person of ordinary skill in the art may appreciate additional benefits.

Conductive Filament Embodiments

Figure 2:
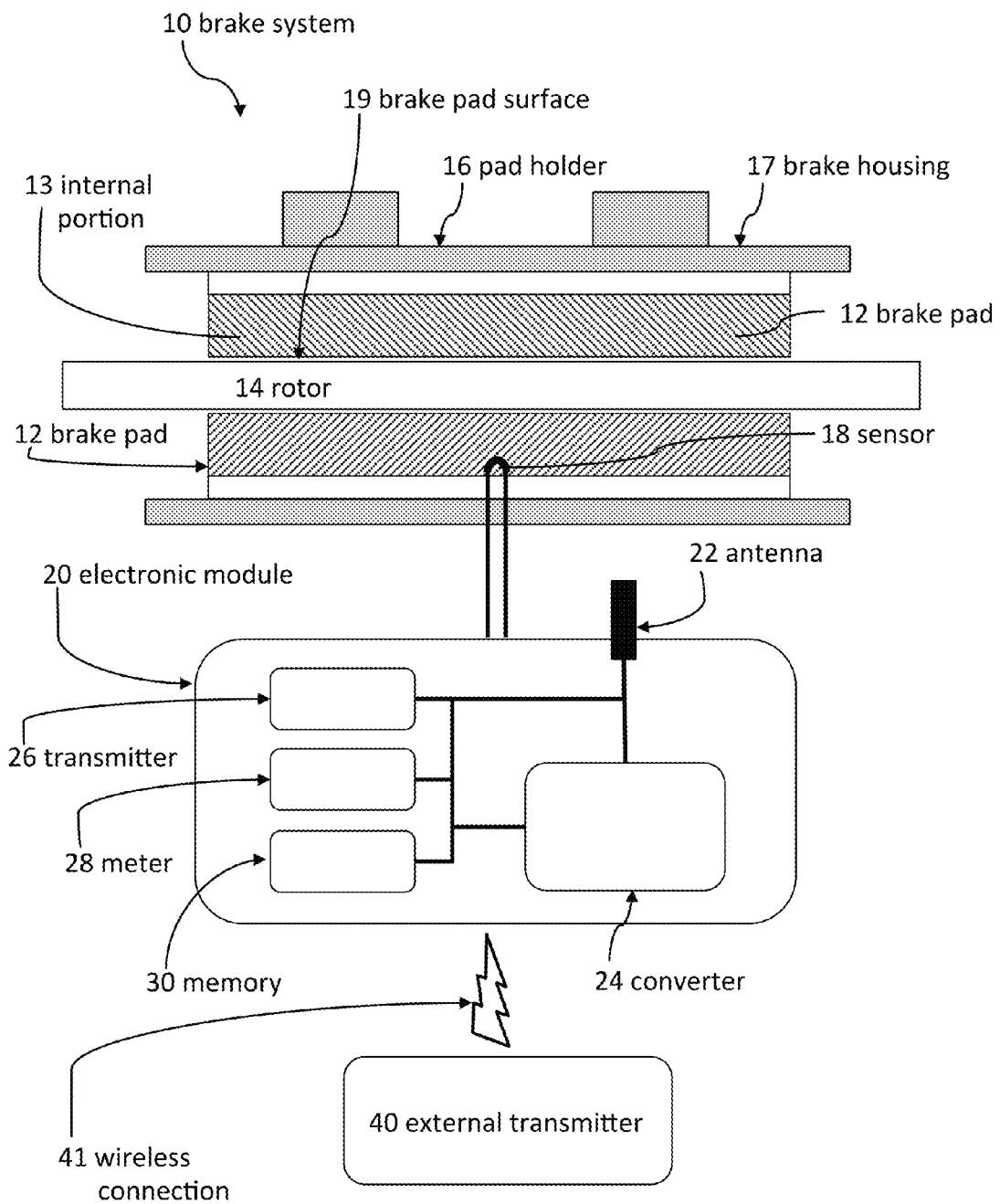
FIG. 2 illustrates a brake system, according to embodiments of the present disclosure.
Figure 3A:
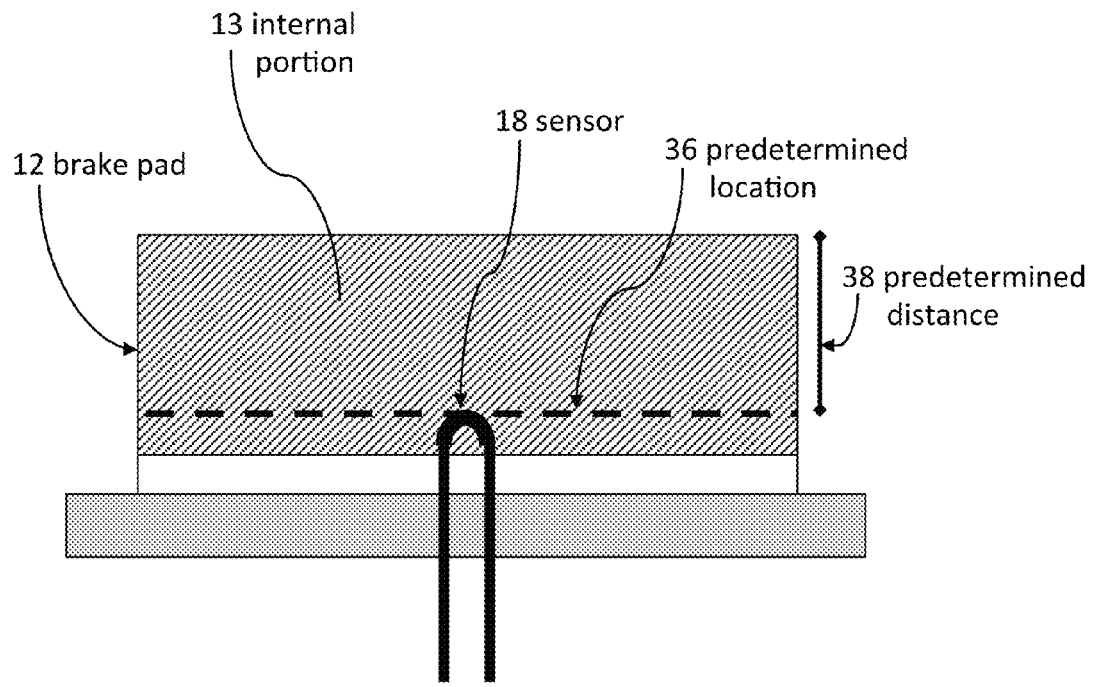
FIG. 3a illustrates a portion of a brake pad, according to embodiments of the present disclosure.
Figure 3B:
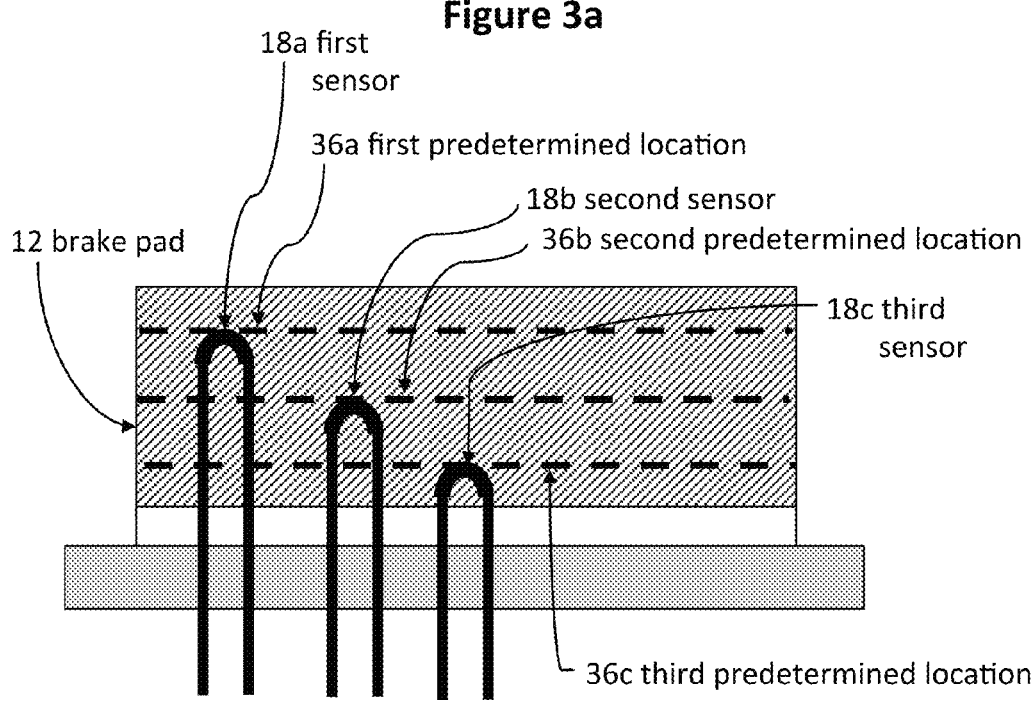
FIG. 3b illustrates a portion of a brake pad, according to embodiments of the present disclosure.

In regards to specific embodiments, FIG. 2 illustrates a brake system 10 for indicating wear of a brake pad 12, such as a brake pad used in a vehicle disk brake system (as shown) or a vehicle drum brake system (not shown). In some embodiments, the brake system 10 can include a brake housing 17 and a brake pad 12 mechanically coupled to the brake housing 17. As shown in FIGS. 2, 3a, and 3b, the brake system 10 can include a sensor 18 to determine when the brake pad 12 has been worn to a predetermined location 36, or thickness, by a rotating portion of a wheel, such as a rotor 14 (i.e. rotating disk) or a drum (not shown). In other words, the sensor 18 can determine when an internal portion 13 of the brake pad 12 has worn by a predetermined distance 38, which can indicate a remaining thickness of the internal portion 13 to thereby signal when the brake pad 12 needs to be replaced.

In some embodiments, the brake system 10 further includes a pad holder 16 mechanically coupled to the brake housing 17. In such embodiments, the sensor 18 can be configured to determine a distance between the pad holder 16 and a brake pad surface 19 that contacts the rotor 14 or drum, which can be indicative of a remaining thickness of the internal portion 13 of the brake pad 12.

The brake system can also include an electronic module 20 electrically and/or communicatively coupled to the sensor 18. The electronic module 20 can be coupled to the sensor 18 via a wireless or wired connection. As such, the electronic module 20 can be configured to receive information from the sensor 18 and thereby transmit the information to devices communicatively coupled to the electronic module 20 for ultimate retrieval by a technician or vehicle operator. The electronic module 20 can be mechanically coupled to the brake housing 17 and/or pad holder 16. For example, the electronic module 20 can be located within 36 inches, 24 inches, 12 inches, 6 inches, 3 inches of the brake pad 12, or closer.

As shown in FIG. 3a, the sensor 18 can comprise an electrically conductive filament disposed at a predetermined location 36 within an internal portion 13 of the brake pad 12. Accordingly, the sensor 18 can measure electrical conductivity within the internal portion 13 of the brake pad 12. In this regard, when the internal portion 13 is eroded (or worn) down to the predetermined location 36 of the sensor 18, the electrical conductivity, as measured by the sensor 18, can decrease—and in some embodiments, the sensor 18 can measure the conductivity as zero.

Accordingly, the electronic module 20 can also include a meter 28, such as a conductivity meter, that can be electrically and/or communicatively coupled to the sensor 18. In this regard, when the internal portion 13 of the brake pad 12 is worn down to the sensor 18 and the conductive filament is thereby torn from the sensor 18, the electrical conductivity of the filament measured by the meter 30 can drop to zero. The drop in conductivity can thereby indicate that the internal portion 13 has been worn down to the predetermined location 36, which can mean that the brake pad 12 needs to be replaced.

In some embodiments, the sensor 18 can be mechanically coupled to the brake pad 12. The sensor 18 can be fully embedded within the brake pad 12, at least partially embedded within the brake pad 12, or even located adjacent to the brake pad 12. Even still, the sensor 18 can be remotely located with respect to the brake pad 12. In such embodiments, the sensor 18 can detect various indications of wear of the internal portion 13 of the brake pad 12 via a wireless and/or wired connection.

As illustrated in FIG. 3b, the brake system 10 can include more than one sensor 18. For example, the brake system 10 can include two or more sensors 18 disposed at different predetermined locations 36, or thicknesses, within an internal portion 13 of the brake pad 12. In this regard, multiple sensors 18 can indicate different levels of wear of the brake pad 12. For example, a first sensor 18a can be disposed at a first predetermined location 36a, such as to indicate when 25% of the original thickness of the internal portion 13 has been worn away. In some embodiments, a second sensor 18b can be disposed at a second predetermined location 36b, such as to indicate when 50% of the original thickness of the internal portion 13 has been worn away. Even still, in some embodiments, a third sensor 18c can be disposed at a third predetermined location 36c, such as to indicate when 75% of the original thickness of the internal portion 13 has been worn away. Generally, it should be appreciated that the brake system 10 can include any number of sensors 18 disposed at various predetermined locations (i.e. heights or thicknesses) of the internal portion 13 to indicate various levels of wear.

In some embodiments, the electronic module 20 includes an antenna 22, such as a radio frequency antenna, configured to wirelessly receive radio frequency energy from an external radio frequency transmitter 40. The electronic module 20 can also include an energy converter 24 electrically coupled to the radio frequency antenna 22. The energy converter 24 can receive radio frequency energy from the antenna 22 whereby the converter 24 transforms the radio frequency energy into supply energy, usually in the form of direct current (DC). The supply energy can thereby power other components of the electronic module 20, such as the meter 28, and other components discussed throughout this disclosure.

Furthermore, in some embodiments, the electronic module 20 includes memory 30 electrically coupled to the antenna 22, energy converter 24, and/or meter 28. The memory 30 can also be powered by the supply energy. As well, the memory can be mechanically coupled to the brake housing 17 via the electronic module 20. The memory 30 can store various data, such as but not limited to, at least one of initial brake pad thickness information (i.e. the thickness of the internal portion 13 when the brake pad 12 was first installed), current brake pad thickness information (i.e. the current thickness of the internal portion 13), brake pad wear profile information (i.e. any data related to wear profiles of the internal portion 13), brake pad installation information (e.g. date, location, and the like), and wheel identification information (i.e. the location of the wheel with respect to the vehicle—e.g. front driver-side wheel). This information can be valuable to assess the longevity of each of the brake pads 12. As well, the information can be useful when the brake pads 12 are installed on different dates.

As well, the electronic module 20 can include an internal transmitter 26 electrically coupled to the antenna 22, energy converter 24, meter 28, and/or memory 30. Like the other components of the electrical module 20, the internal transmitter 26 can be powered by the supply energy. The internal transmitter 26 can also be configured to wirelessly transmit electrical information from the meter 28 and/or memory 30 to the external radio frequency transmitter 40. In some embodiments, the internal transmitter 26 transmits the information to the external radio frequency transmitter 40 via the radio frequency antenna 22.

Accordingly, the brake system 10 can also include the external transmitter 40 that can be electrically and/or communicatively coupled to the electronic module 20 via wireless connection 41. The external transmitter 40 can transmit the radio frequency energy to the antenna 22. As well, the external transmitter 40 can simultaneously receive information from the electronic module 20 in regards to the brake pad 12. Accordingly, the external transmitter 40 can thereby display an indication of the information so that the technician and/or vehicle operator can determine the status of the brake pad 12.

The external transmitter 40 can be operated in one or at least two modes. For example, in a first mode, the external transmitter 40 can be located within close proximity to each one of the brake pads 12, and thereby interrogate each brake pad 12 individually. The external transmitter 40 can also operate a second mode in which the external transmitter 40 interrogates more than one brake pad 12 or all of the brake pads coupled to a vehicle at the same time. In this manner, the electronic modules 20 and corresponding circuitry of each brake pad 12 are energized at the same time. As well, information from each of the brake pads 12 can be transmitted to the external transmitter 40 at the same time. The external transmitter 40 can thereby process the information and display indications of the information (from all brake pads 12) so that the technician and/or vehicle operator can determine the status of all the brake pads 12 at relatively the same time. In such embodiments, because the external transmitter 40 is interrogating more than one brake pad 12 and doing so at a greater distance than in the first mode, the external transmitter 40 may have to generate more energy, with respect to the first mode, to energize all of the electronic modules 20 of all the brake pads 12.

Resistivity Brake Pad Embodiments

Figure 4:
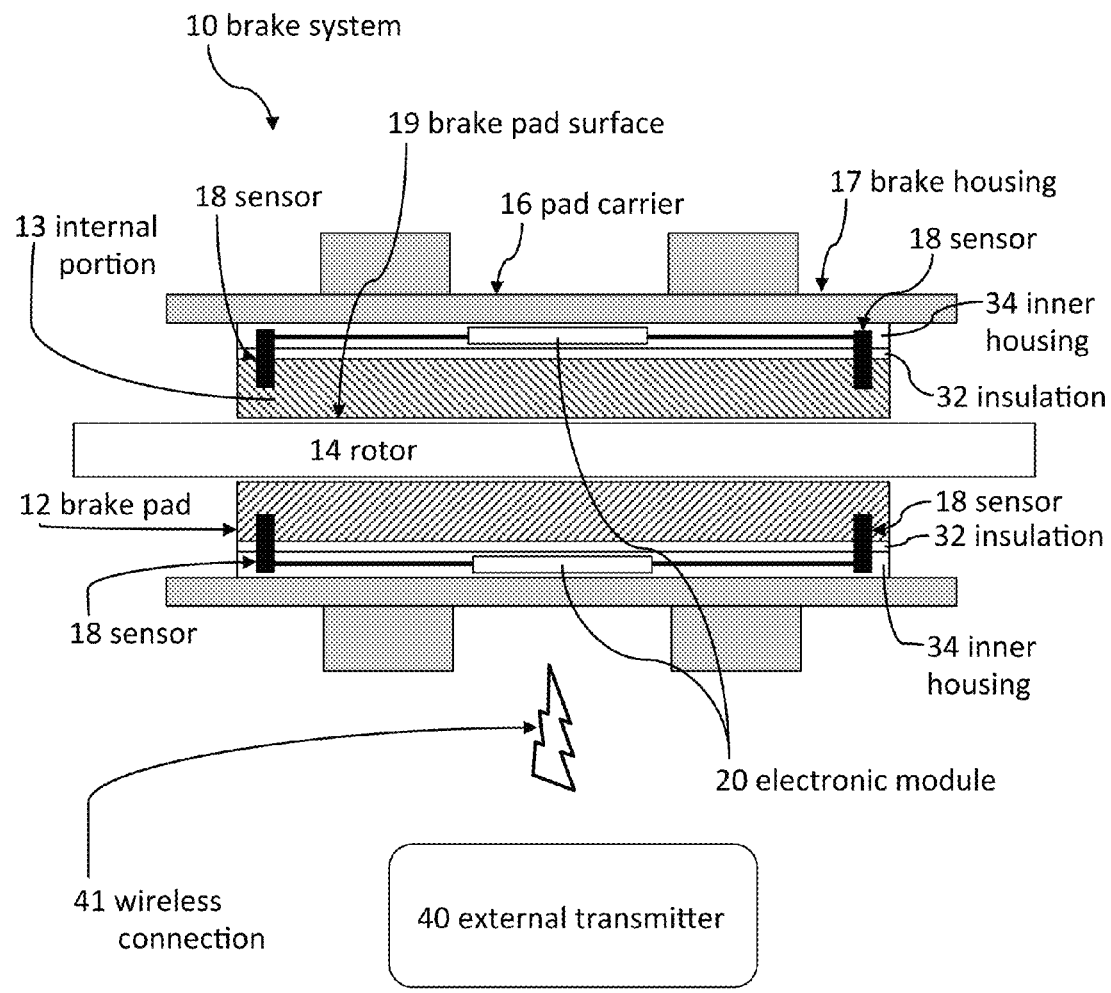
FIG. 4 illustrates a brake system, according to embodiments of the present disclosure.

With reference to FIG. 4, a brake system 10 can include brake pads 12 that are configured to detect electrical properties of the brake pad 12, which can indicate the thickness of an internal portion 13 of the brake pad 12. Accordingly, a traditional brake pad can be replaced by a brake pad 12 that is at least partially conductive to electrical current. In this manner, the inner portion 13 of the brake pad 12 can be doped with electrically conductive material. Therefore, the inner portion 13 may have a combination of ceramic (non-conductive material) and conductive material (as doped throughout). The combination of materials can thereby convert the inner portion 13 of the brake pad 12 into an electrical resistor with a resistivity (inversely) related to the thickness of the inner portion 13.

Accordingly, the electrical resistivity of the brake pad 12 can be periodically or continuously measured by embedded electronic circuitry, such as a meter 28 coupled to sensors 18, such as electrodes, located at various points along the inner portion 13 of the brake pad 12. It should be appreciated that the meter 28 can be configured to measure conductivity, resistivity, and/or the like.

The brake system 10 can include at least two electrodes, or sensors 18, embedded within the brake pad 12. The at least two electrodes 18 can measure the electrical resistivity of the internal portion 13 of the brake pad 12 between the electrodes 18. As such, the electrical resistivity can indicate a thickness of the internal portion 13 of the brake pad 12 after a rotating portion of a wheel, such as a rotor 14 or drum, has eroded the brake pad surface 19 of the internal portion 13. In some embodiments, the electrical resistivity can be inversely proportional to a thickness of the internal portion 13. For example, as the thickness of the internal portion 13 decreases, the electrical resistivity of the internal portion 13 can increase. Accordingly, as the thickness of the internal portion 13 decreases, the conductance of the internal portion 13 can decrease.

As well, because the thickness, size, and electrical resistivity of the internal portion 13 of brake pads 12 can vary from pad to pad, as long as the brake system 10 can determine the initial electrical resistivity of the initial thickness of the internal portion 13, then the brake system 10 can determine any thickness of the internal portion 13 thereafter. For example, if the brake system 10 determines that the initial electrical resistivity is X, then when X increases to 2X, the thickness of the internal portion 13 of the brake pad is 50% of the initial thickness. Moreover, if the initial electrical resistivity is X, then when X increases to 3X, the thickness of the internal portion 13 of the brake pad is 33.33% of the initial thickness. Generally, as long as the brake system 10 is able to determine an electrical resistivity of a thickness of the internal portion 13 of the brake pad 12, then the brake system 10 can determine any other thickness thereafter.

In some embodiments, the conductive material can comprise conductive carbon material, such as graphite, and/or metallic particulate compound that reduces the resistivity of the inner portion 13 of the brake pad 12 in addition to hardening the material of the inner portion 13. Even still, in some embodiments, the conductive material can include a combination of metallic particulate matter and conductive carbon particulate matter.

Figure 5:
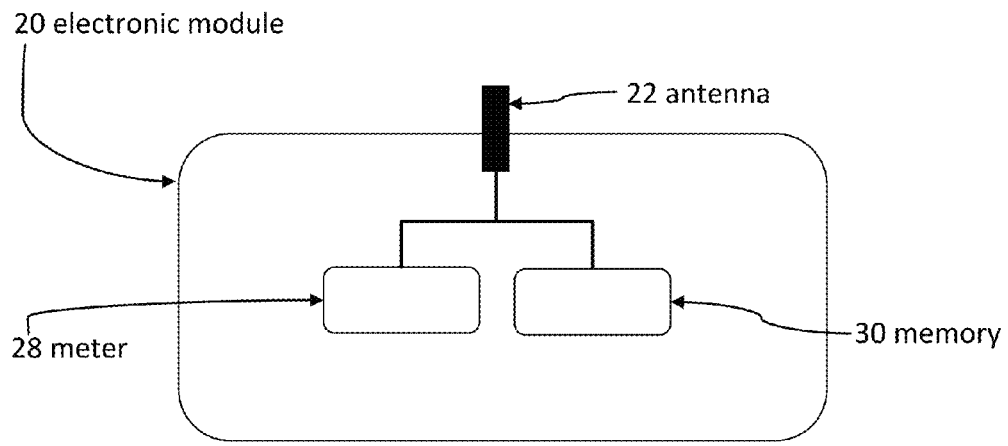
FIG. 5 illustrates an electronic module, according to embodiments of the present disclosure.
Figure 6:
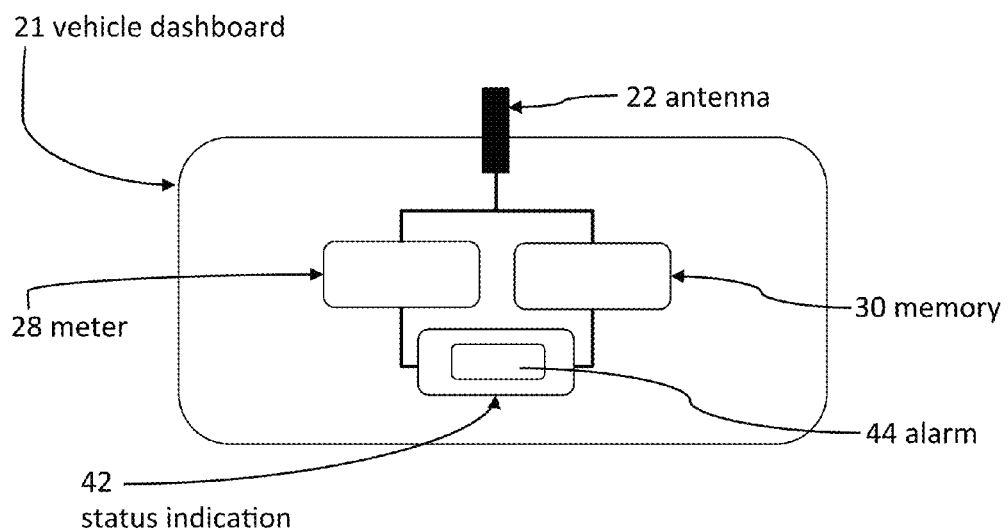
FIG. 6 illustrates a vehicle dashboard, according to embodiments of the present disclosure.

With reference to FIGS. 5 and 6, the brake system 10 can also include various electrical components, housed within an electronic module and/or a vehicle dashboard 21, such as, an antenna 22, meter 28, and memory 30. As previously described, the radio frequency antenna 22 can be configured to wirelessly receive radio frequency energy from an external radio frequency transmitter 40. The radio frequency energy can thereby generate electrical current via the electrically conductive material located within the internal portion 13 of the brake pad 12. As such, the electrical current can indicate the electrical resistivity of the internal portion 13.

The electronic module 20 can be disposed within various locations of the vehicle. In some embodiments, the electronic module 20 is disposed within an inner housing of the brake pad 12, which is electrically isolated from the conductive portion of the internal portion 13 of the brake pad 12 by insulation 32. In some embodiments, the electronic module 20 is located in close proximity to the brake housing 17, and can be coupled with the sensors 18 via a wireless or wired connection. Even still, in some embodiments, the electronic module 20 is located within the dashboard 21 of the vehicle and can thereby be coupled with the sensors 18 via a wireless or wired connection.

In some embodiments, whereby at least part of the electronic module 20 is located on or near the dashboard 21 of the vehicle, the system can further include a status indication 42 displayed on the dashboard 21. The status indication 42 can thereby indicate the thickness of the internal portion 13 of the brake pad 12. In some embodiments, the status indication 42 can include an alarm 44 that alerts a vehicle operator (i.e. user) that the thickness of the internal portion 13 meets a predetermined thickness. The predetermined thickness can indicate various wear levels of the internal portion 13 of the brake pad 12, such as a level when the brake pad needs to be replaced.

The external transmitter 40 can be physically detached from the vehicle or physically integrated into the vehicle. Regardless of the location of the external transmitter 40, the external transmitter 40 can still be communicatively and/or electrically coupled to the electronic module 20. For example, the external transmitter 40 can be located along the dashboard 21 of the vehicle, whereby the external transmitter 40 continuously and/or periodically communicates with the electronic module 20. It should be appreciated that any portion of the electronic module 20 and/or external transmitter 40 can be located on the vehicle, such as along the dashboard 21, and/or within close proximity of the brake pad 12.

As well, any of the systems and methods described throughout this disclosure can be adapted and configured to fit into any type and/or model of motor vehicle or non-motor vehicle. For example, the brake system 10 can be used in cars, trucks, buses, recreation vehicles, military vehicles, armored vehicles, unmanned vehicles, experimental vehicles, motorcycles, scooters, and the like. Even still, the brake system 10 can be attached to vehicles at various stages of manufacturing. For example, the brake system 10 can be built into the vehicle on the production line at the time the vehicle is manufactured. Even still, the brake system 10 can be sold as an after-market system that can be attached to any existing vehicle.

Methods of Detecting Thickness of a Brake Pad

Figure 7:
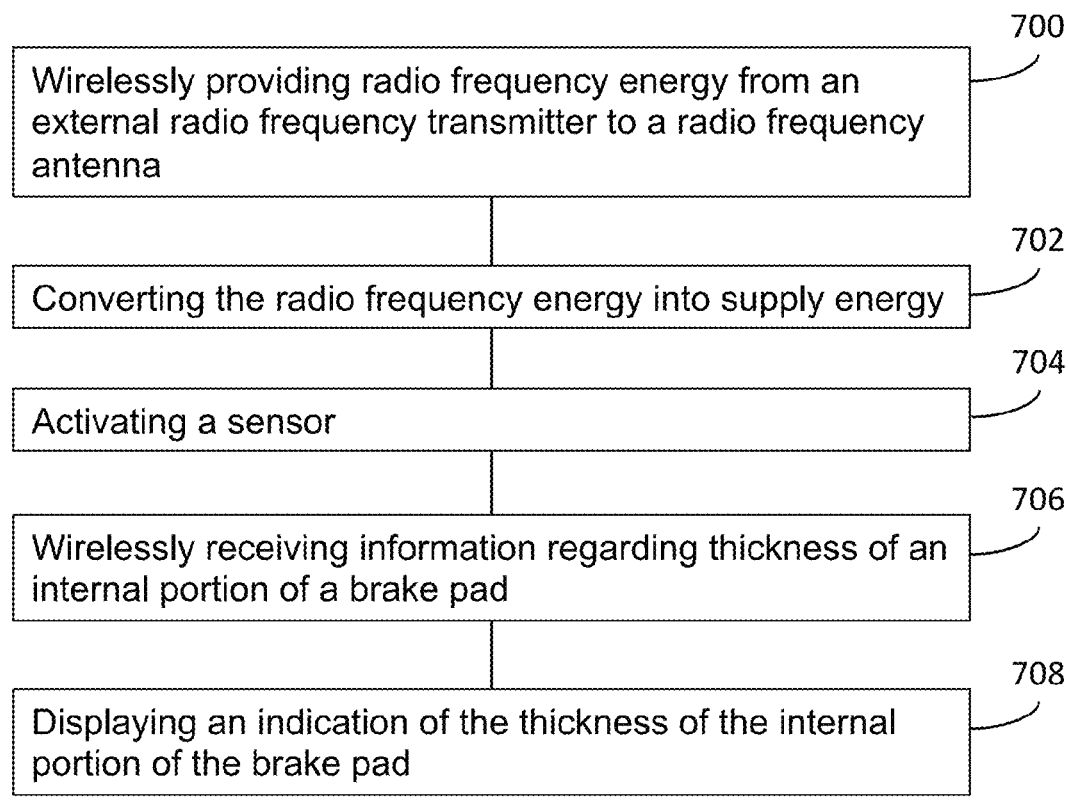
FIGS. 7, 8, and 9 depict flow diagrams showing methods of operating brake systems, according to some embodiments.
Figure 8:
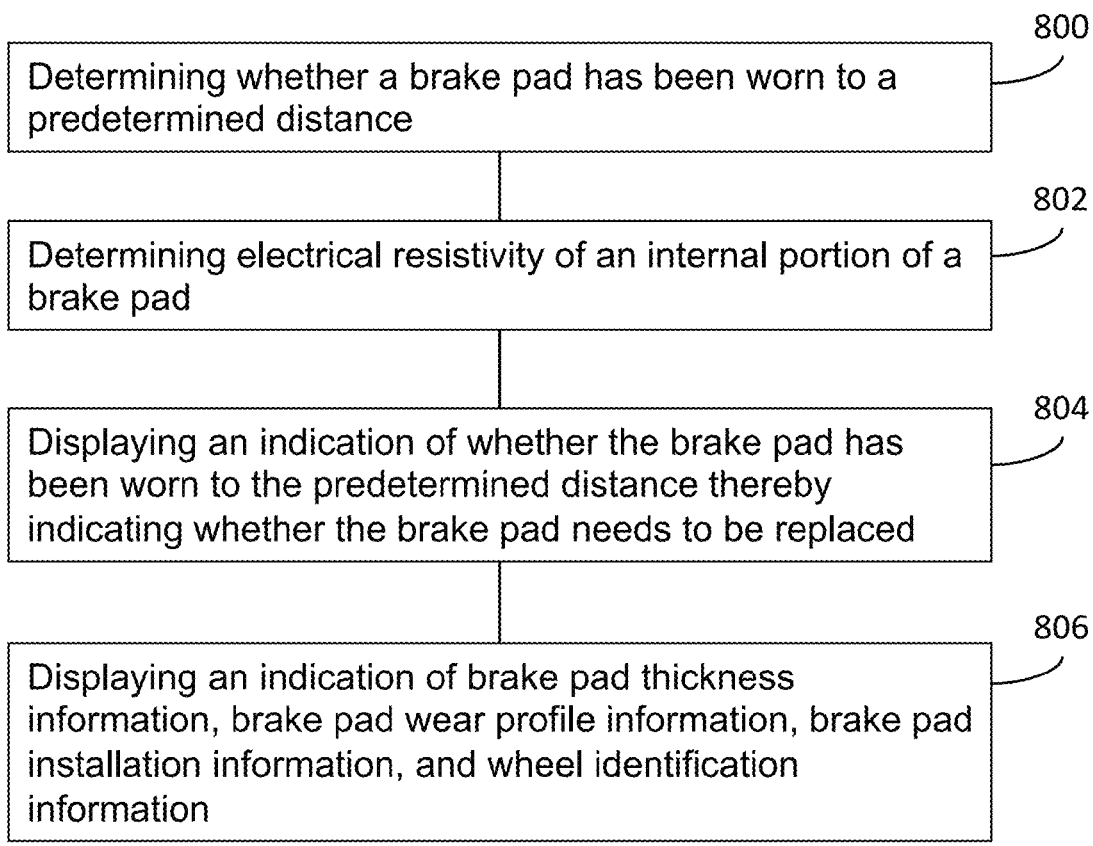
Figure 9:
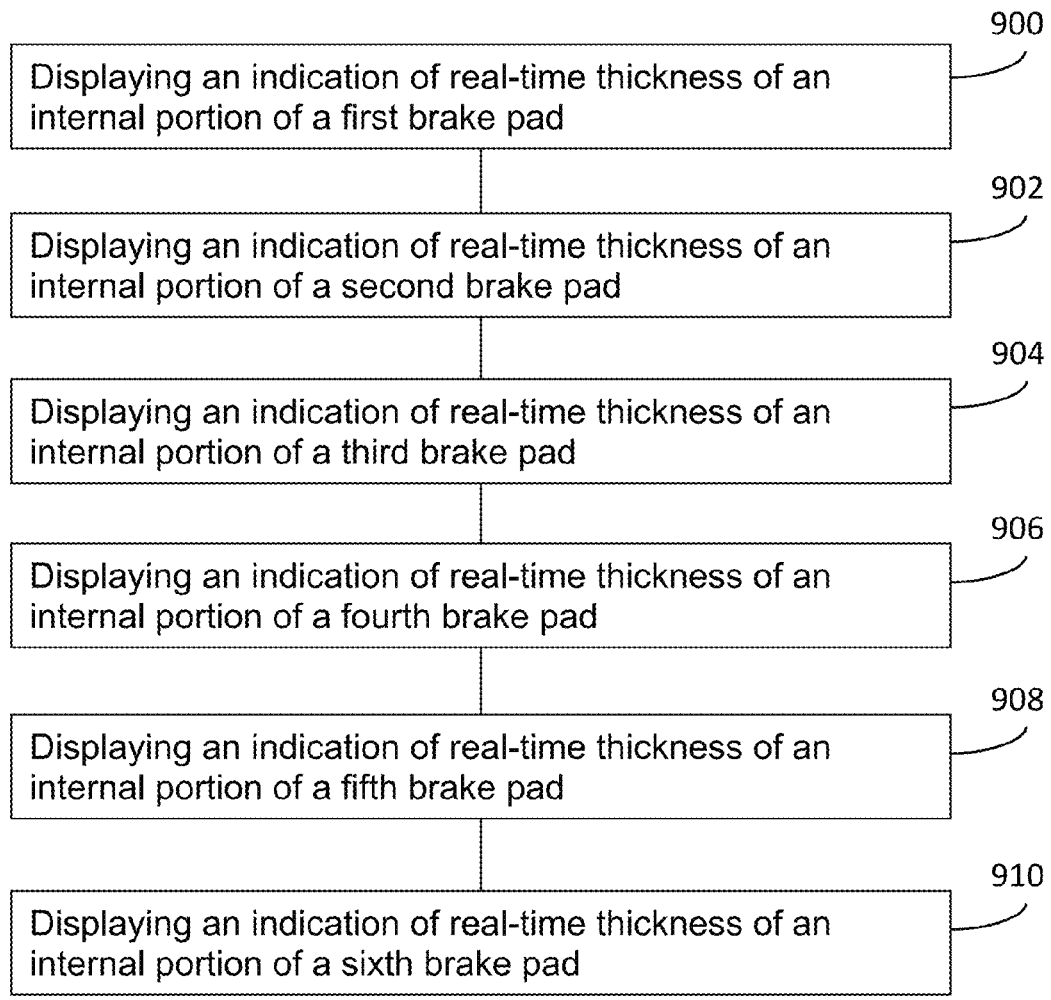

As illustrated in FIGS. 7, 8, and 9, the disclosure also includes a method of determining thickness of a brake pad 12 that impedes rotation of a wheel mechanically coupled to a vehicle. The thickness can be determined without removing the wheel from the vehicle.

As shown in FIG. 7, methods can include wirelessly providing radio frequency energy from an external radio frequency transmitter 40 to a radio frequency antenna 22 mechanically coupled to a brake housing 17 that holds the brake pad 12 (at step 700). As well, methods can include converting, by an energy converter 24 electrically coupled to the radio frequency antenna 22, the radio frequency energy into supply energy (at step 702). Even still, methods can include activating, by the supply energy, a sensor 18 mechanically coupled to the brake pad 12 and electrically coupled to the energy converter 24 and the radio frequency antenna 22 (at step 704).

Methods can also include wirelessly receiving, by the external radio frequency transmitter 40, information regarding the thickness of an internal portion 13 of the brake pad 12 (at step 706). In some embodiments, the external radio frequency transmitter 40 is communicatively coupled to an internal transmitter 26 electrically coupled to both the sensor 18 and the radio frequency antenna 22. As well, methods can include displaying, by the external radio frequency transmitter 40, an indication of the thickness of the internal portion 13 of the brake pad 12 (at step 708). In some embodiments, the external radio frequency transmitter 40 is not mechanically coupled to the vehicle.

As previously described, the sensor 18 can include an electrically conductive filament embedded within the brake pad 12 at a predetermined distance with respect to a brake pad surface 19 that contacts the rotating portion of the wheel, such as a rotor 14. With reference to FIG. 8, methods can also include determining, by the sensor 18, whether the brake pad 12 has been worn to the predetermined distance (at step 800). Methods can also include displaying, by the external radio frequency transmitter 40, an indication of whether the brake pad 12 has been worn to the predetermined distance (at step 802). The indication can thereby indicate whether the brake pad 12 needs to be replaced.

In some embodiments, the internal portion 13 of the brake pad 12 can comprise electrically conductive material such that the internal portion 13 is at least partially conductive and has a predetermined electrical resistivity. The sensor 18 can thereby be embedded within the internal portion 13 so that the sensor 18 can detect an electrical resistivity of the internal portion 13. In some embodiments, the electrical resistivity can be inversely proportional to a thickness of the internal portion 13. Accordingly, methods can include determining the electrical resistivity of the internal portion 13 of the brake pad 12 (at step 804). As well, methods can include displaying, by the external radio frequency transmitter 40, the thickness of the internal portion 13 to thereby indicate whether the brake pad 12 needs to be replaced.

Embodiments can also include memory 30 that can be mechanically coupled to the brake housing 17 and electrically coupled to the internal transmitter 26 and the radio frequency antenna 22. The memory 30 can store brake pad thickness information, brake pad wear profile information, brake pad installation information, and wheel identification information. Methods can further comprise displaying, by the external radio frequency transmitter 40, an indication of brake pad thickness information, brake pad wear profile information, brake pad installation information, and wheel identification information (at step 806).

Embodiments of the brake system 10 can also include a resistivity meter 28 that is electrically coupled to the radio frequency antenna 22 and the energy converter 24. As illustrated in FIG. 9, methods can further include displaying, by a dashboard of the vehicle, an indication of real-time thickness of an internal portion 13 of a first brake pad 12 (at step 900). Accordingly, methods can also include displaying, by the dashboard of the vehicle, an indication of real-time thickness of an internal portion 13 of a second brake pad 12 (at step 902). Methods can include displaying, by the dashboard of the vehicle, an indication of real-time thickness of an internal portion 13 of a third brake pad 12 (at step 904). Even still, methods can include displaying, by the dashboard of the vehicle, an indication of real-time thickness of an internal portion 13 of a fourth brake pad 12 (at step 906). Methods can also include displaying, by the dashboard of the vehicle, an indication of real-time thickness of an internal portion 13 of a fifth brake pad 12 (at step 908). Methods can even include displaying, by the dashboard of the vehicle, an indication of real-time thickness of an internal portion 13 of a sixth brake pad 12 (at step 910).

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A system for indicating wear of a brake pad attached to a vehicle, comprising:
   a brake housing;
   a brake pad mechanically coupled to the brake housing;
   a sensor mechanically coupled to the brake pad, wherein the sensor determines whether the brake pad has been worn to a predetermined location by a rotating portion of a wheel;
   an on-board electronic module electrically coupled to the sensor and mechanically coupled to the vehicle, wherein the on-board electronic module comprises:
      a radio frequency antenna configured to wirelessly receive radio frequency energy from an external radio frequency transmitter;
      an energy converter electrically coupled to the radio frequency antenna, wherein the energy converter is configured to transform the radio frequency energy to supply energy;
      memory coupled to the energy converter whereby the memory is powered by at least a portion of the supply energy, wherein brake pad installation information and wheel identification information is stored within the memory located on-board the vehicle; and
      an internal transmitter coupled to the energy converter whereby the internal transmitter is powered by at least a portion of the supply energy, wherein the internal transmitter is configured to wirelessly transmit information from the sensor and the memory to the external radio frequency transmitter via the radio frequency antenna.

2. The system of claim 1, further comprising the external radio frequency transmitter communicatively coupled to the radio frequency antenna, and wherein the on-board electronic module is located within 12 inches of the brake pad.

3. The system of claim 2, wherein the rotating portion comprises one of a rotating disk and a drum, and wherein the sensor is at least partially embedded within the brake pad.

4. The system of claim 3, wherein the sensor comprises an electrically conductive filament embedded in the brake pad at a predetermined distance with respect to a brake pad surface that contacts the rotating portion of the wheel, and wherein electrical conductivity measured by the conductive filament decreases when the brake pad is worn to at least the predetermined location.

5. The system of claim 1, wherein the memory stores initial brake pad thickness information.

6. The system of claim 5, wherein the brake pad installation information comprises at least one of a date and a location.

7. The system of claim 1, further comprising a pad holder mechanically coupled to the brake housing, wherein the sensor is configured to determine distance between the pad holder and a brake pad surface that contacts the rotating portion of the wheel.

8. The system of claim 1, wherein the memory stores current brake pad thickness information.

9. The system of claim 1, wherein the memory stores brake pad wear profile information.

10. The system of claim 1, wherein the external radio frequency transmitter is located adjacent to a dashboard of the vehicle.

11. The system of claim 1, wherein the wheel identification information comprises a location of the wheel with respect to the vehicle.

12. A method of determining thickness of a brake pad that impedes rotation of a wheel mechanically coupled to a vehicle, wherein the thickness is determined without removing the wheel from the vehicle, the method comprising:
   determining, via a sensor mechanically coupled to the brake pad, whether the brake pad has been worn to a predetermined location by a rotating portion of the wheel;
   wirelessly receiving, via an on-board electronic module electrically coupled to the sensor and mechanically coupled to the vehicle, radio frequency energy from an external radio frequency transmitter;
   transforming, via an energy converter electrically coupled to a radio frequency antenna, the radio frequency energy to supply energy;
   storing brake pad installation information and wheel identification information via memory coupled to the energy converter, wherein the memory is located on-board the vehicle;
   powering an internal transmitter coupled to the energy converter by at least a portion of the supply energy; and
   wirelessly transmitting, via the internal transmitter, information from the sensor and the memory to the external radio frequency transmitter through the radio frequency antenna.

13. The method of claim 12, further comprising communicatively coupling the external radio frequency transmitter to the radio frequency antenna.

14. The method of claim 12, further comprising determining distance between a pad holder and a brake pad surface that contacts the rotating portion of the wheel, wherein the pad holder is mechanically coupled to a brake housing.

15. The method of claim 12, further comprising storing, via the memory, initial brake pad thickness information.

16. The method of claim 12, further comprising storing, via the memory, current brake pad thickness information.

17. The method of claim 12, further comprising storing, via the memory, brake pad wear profile information.

18. The method of claim 12, further comprising displaying, by the external radio frequency transmitter, an indication of the thickness of the brake pad.

19. The method of claim 18, further comprising displaying, by the external radio frequency transmitter, an indication of whether the brake pad has been worn to the predetermined location thereby indicating whether the brake pad needs to be replaced.

20. The method of claim 18, further comprising displaying, by the external radio frequency transmitter, the thickness of the brake pad.

* * * * *